United States Patent [19]

Henderson et al.

[11] Patent Number: 4,882,750

[45] Date of Patent: Nov. 21, 1989

[54] PROGRAMMABLE DIALER SYSTEM

[76] Inventors: Daniel A. Henderson, P.O. Box 110624, Arlington, Tex. 76094; William T. Mostyn, Jr., P.O. Box 457, Waco, Tex. 76643

[21] Appl. No.: 172,137

[22] Filed: Mar. 23, 1988

[51] Int. Cl.⁴ .................................. H04M 1/26
[52] U.S. Cl. .............................. 379/355; 379/356
[58] Field of Search ............ 379/354, 355, 356, 357, 379/358, 359, 216, 40

[56] References Cited

U.S. PATENT DOCUMENTS 4,763,355  8/1988  Cox ..................................... 379/355

FOREIGN PATENT DOCUMENTS

0144056  7/1985  Japan ................................... 379/355
0152148  7/1986  Japan ................................... 379/355

Primary Examiner—James L. Dwyer
Attorney, Agent, or Firm—Melvin A. Hunn

[57] ABSTRACT

A telephone dialer system consists of a programming unit, and a portable telephone dialer unit for producing a selected sequence of dual tone modulated frequency dialing tones, adapted to be programmed by the programming unit when said portable telephone dialer is releasably electrically coupled to said programming unit. The portable telephone dialer has a case, a reprogrammable memory, a programming interface, a speaker, a battery, a dual tone modulated frequency signal generating integrated circuit chip, and a single bi-state switch operable from the exterior of the case.

22 Claims, 7 Drawing Sheets

PROGRAMMABLE DIALER SYSTEM

BACKGROUND OF THE INVENTION

1. Field of the Invention

This invention relates generally to preprogrammable telephone dialers, and specifically to a dialer unit that can be preprogrammed by a programming module that releasably couples with said dialer.

2. 2. Description of the Prior Art

It is a very common business practice for companies to give specially manufactured gifts to clients and prospective clients in an effort to generate more business. These gifts are generally inexpensive items that have been customized to carry company logos, addresses, telephone numbers and similar materials.

An entire industry has developed to manufacture these "give-away" items. This industry is known generally as the specialty advertising industry. The variety of ornamental and functional gift items manufactured in this industry include business cards, pencils, calendars, clocks, and calculators. One very important goal of the specialty advertising industry is to make a company's phone number easily accessible to potential clients.

A variety of repertory dialers are currently available in the market place. These repertory dialers have a keypad that allows the operator to program the dialer memory with a plurality of selected telephone numbers. When the operator wishes to dial a particular number, this number is retrieved from the repertory dialer memory through use of the keypad. Next, the operator places the repertory dialer speaker in close proximity with a telephone mouthpiece and then causes the repertory dialer to produce a sequence of audible dial tones that correspond to the selected telephone number. Thus, the repertory dialer eliminates the task of physically dialing the desired number with the telephone keypad.

Repertory dialers have several inherent limitations that render them useless as specialty advertising give-away items. First, the keyboard on a repertory dialer is generally an expensive item which often renders the repertory dialer too expensive for specialty advertising use. Second, the keyboard on a repertory dialer greatly increases the size of the repertory dialer, often making the repertory dialer too large and cumbersome for specialty advertising use. Third, while repertory dialers can be programmed with a particular desired number, the potential customer can reprogram the repertory dialer with a different number through use of the keypad on said repertory dialer, destroying the advertising value of the dialer.

SUMMARY OF THE INVENTION

The present invention is a telephone dialer system that yields a portable telephone dialer that is suitable for specialty advertising purposes. Specifically, the dialer system comprises a portable dialer adapted to releasably couple with a programming unit which is used to program the reprogrammable memory of the dialer unit. The dialer unit is only coupled to the programming unit during a programming mode; thereafter, the dialer unit is decoupled and completely functional independently of the programming unit.

In the preferred embodiment, the programming unit consists of a microcomputer with internal memory, a numeric keypad, a display means such as a liquid crystal display, a means for simulating the operation of a telephone keypad such as a 4-by-4 crosspoint switch, and a programming head for releasably coupling with a dialer unit. The microcomputer is programmed to accept a sequence of digits entered by the operator on the numeric keypad, as well as the quantity of dialers to be sequentially programmed in an assembly line fashion. The operation of the microcomputer may be controlled by a personal computer.

In the preferred embodiment, the dialer unit consists of a case, a reprogrammable memory, a dual tone modulated frequency signal producing integrated circuit, an audiofrequency output device, a battery, a single bistate switch operable from the exterior of the case, and a means for releasably electrically coupling the programming head of the programming unit to the reprogrammable memory of the dialer unit. This dialer unit has no keyboard.

In the preferred embodiment, the dialer unit is preprogrammed with a single telephone number when the dialer is releasably coupled to the programming unit during a programming mode, and thereafter may only be reprogrammed through use of the programming unit.

The present invention has several distinct advantages over existing repertory dialers. First, since the dialer unit has no keypad, it is less expensive than repertory dialers and thus more suitable for specialty advertising use. Second, since the dialer unit has no keypad it is much smaller than existing repertory dialers and thus more portable and suitable for specialty advertising purposes. Third, since the repertory dialer has no keypad it may not be reprogrammed by the end user. However, the dialer unit is not permanently programmed with a selected number and may be reprogrammed when desired by recoupling the dialer unit to the programming unit; this feature is particularly useful when a company number is changed, or when the dialer unit has been programmed with an incorrect number. Considerable savings can be realized due to the reprogrammable nature of the dialer unit of the present invention, since the dialer units are reusable, and since programming errors may be corrected. Fourth, since the dialer unit has no keypad, a substantial portion of the surface area of the dialer case is available for custom printing.

The above as well as additional objects, features, and advantages of the invention will become apparent in the following detailed description.

DESCRIPTION OF THE PREFERRED EMBODIMENT

Figure 1:
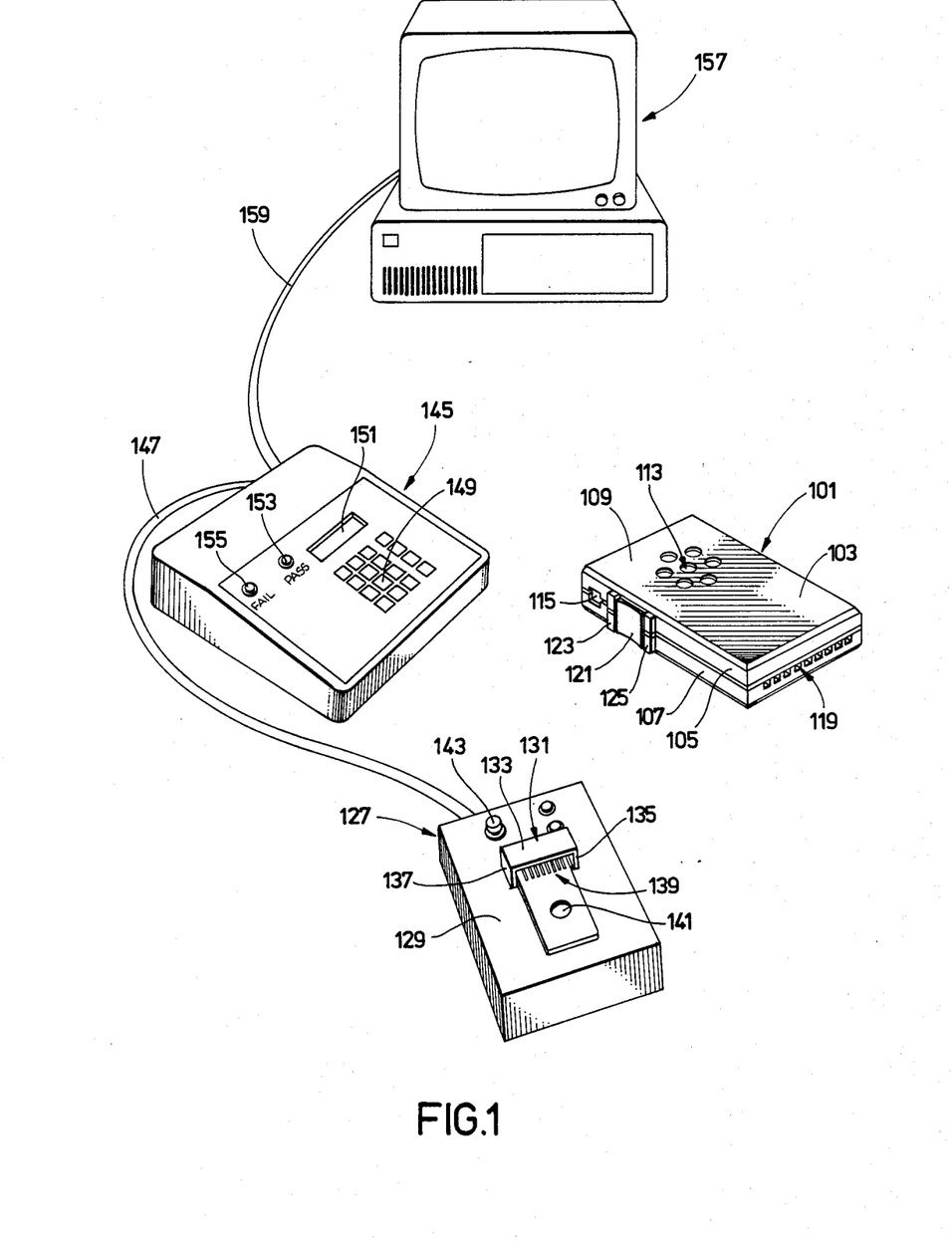
FIG. 1 is a perspective view of a personal computer, programming module, programming head, and portable dialer in accordance with the present invention.

FIG. 1 is a perspective view of a personal computer programming module, programming head, and portable dialer unit in accordance with the present invention.

In the preferred embodiment, the portable dialer unit 101 is a small rectangular case 103 formed of two subassemblies: an upper subassembly 105, and a lower subassembly 107. Subassemblies 105, 107 are formed of plastic and designed to snap together to form a small rectangular-shaped case 103. Each subassembly 105, 107 provides one substantially planar surface 109, 111 (planar surface 111 is not shown in FIG. 1). Advertising material can be applied to substantially planar surfaces 109, 111 by printing, silkscreening, or gluing. Planar surface 109 has a speaker opening 113 that consists of a plurality of small circular holes integrally formed in upper subassembly 105 during the molding process.

In the preferred embodiment, two small rectangular sound ports 115, 117 (sound port 117 not depicted in FIG. 1) are provided on two sides of case 103. These sound ports 115, 117 allow for the optimal acoustic performance of a speaker diaphragm located within case 103. Specifically, sound ports 115, 117 allow the speaker diaphragm to function without pulling a vacuum. The sound ports are approximately 1/10 of an inch square openings that are formed in part by the upper subassembly 105 and in part by the lower subassembly 107.

A plurality of programming ports 119 are disposed along one end of said rectangular case 103. In the preferred embodiment, nine programming ports are provided. Each programming port 119 is a small rectangular opening approximately 1/10 of one inch square that allows access to the small volume of space enclosed by case 103. The plurality of programming ports 119 are formed in part by upper subassembly 105 and in part by lower subassembly 107.

A rubber switch nipple 121 protrudes from yet another opening in one side of case 103. Said rubber switch nipple 121 is disposed between two rectangular nipple guards 123, 125 that are integrally formed in case 103. Said nipple guards 123, 125 protect the rubber switch nipple 121 from physical damage. The rubber switch nipple 121 renders the portable dialer unit 101 operable from the exterior of case 103.

In the preferred embodiment, a programming head 127 is adapted to both releasably physically couple and releasably electrically couple with portable dialer unit 101. The programming head 127 has a substantially planar surface 129, and a dialer unit guide 131 which serves to physically position said portable dialer unit 101 for coupling. In the preferred embodiment, the dialer unit guide 131 is a u-shaped member disposed on planar surface 129. Said dialer unit guide 131 has an elongated rectangular base 133 and two shorter rectangular end sections 135, 137 disposed perpendicular to the rectangular base 133.

A plurality of programming probes 139 are disposed in a spaced-apart fashion along elongated rectangular base 133 parallel to the planar surface 129. In the preferred embodiment, nine programming probes 139 are disposed on dialer unit guide 131, corresponding to the number of programming ports 119 in case 103 of portable dialer unit 101. Microphone port 141 is disposed on the planar surface 129 of programming head 127. Start button 143 is also provided on the programming head 127. It is used during the programming of the dialer units to initiate the programming.

The programming head 127 and portable dialer unit 101 are physically coupled in the following fashion. The portable dialer unit 101 is placed on planar surface 129 of programming head 127 with planar surface 109 in physical contact with planar surface 129. The plurality of programming ports 119 in the end of case 103 are physically aligned with the plurality of programming probes 139 of programming head 137. Dialer unit guide 131 is used to physically align case 103 in a manner to align the plurality of programming probes 139 with the plurality of programming ports 119. Portable dialer unit 101 is advanced along planar surface 129 of programming head 127 until the plurality of programming probes 139 enter the volume enclosed by case 103. In this configuration, the plurality of programming probes are electrically coupled to the circuitry contained within case 103. In addition, microphone port 141 will be aligned with speaker opening 113 of portable dialer unit 101.

Programming head 127 is electrically coupled to programming module 145 by cable 147. Programming module 145 has a keypad 149, a liquid crystal display 151, and two status indicators, a pass light 153 and a fail light 155. The programming module 145 may be coupled to a personal computer 157 via cable 159. In such configuration, the operation of programming module 145 may be controlled by personal computer 157.

Figure 2:
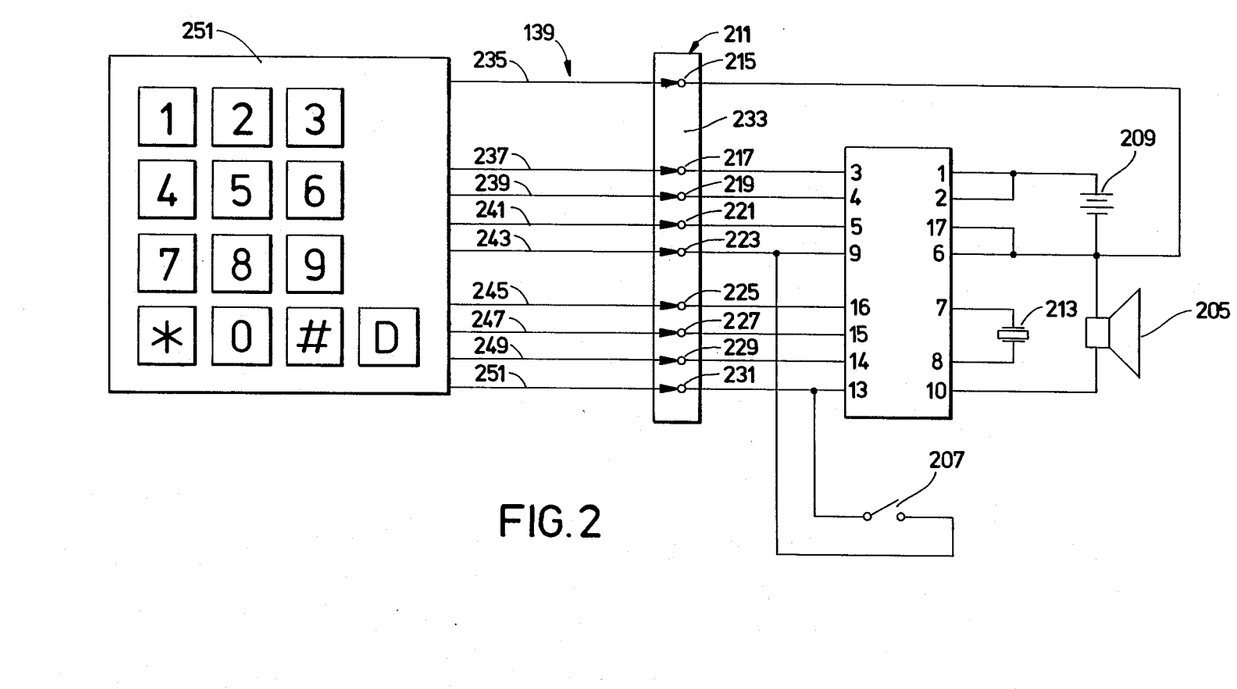
FIG. 2 is an electrical schematic and block diagram of the portable dialer and a matrix keypad in accordance with the present invention.

FIG. 2 is an electrical schematic and block diagram of the portable dialer and a matrix keypad in accordance with the present invention. The portable dialer unit circuit comprises a signal means 201 for producing a sequence of dual tone modulated frequency (DTMF) signals corresponding to a sequence of digits stored in a reprogrammable memory means 203 (not depicted), an audiofrequency output device 205, a switch means 207, a battery 209, and a programming interface 211.

In the preferred embodiment, the signal means 201 and memory means 203 are disposed on a single integrated circuit. In the preferred embodiment, this DTMF integrated circuit is a MK 53731 single number pulse tone switchable dialer manufactured by Thomson Components, having last number redial capabilities. It is an eighteen pin integrated circuit; pins 1–18 are designated in the schematic FIG. 1; however, in that figure, the order of the pins has been altered to simplify the figure.

Audiofrequency output device 205 is coupled between pins 6 and 10 of signal means 201. In the preferred embodiment, this audiofrequency output device 205 is a 100 Ohm Star Micronics speaker, Model No. D529B. In the preferred embodiment, switch means 207 is a single bi-state, normally open, momentary contact switch that is operable from the exterior of case 103. Switch means 207 is connected between pins 9 and 13 of signal means 201, and serves to activate the last number redial feature of the signal means 201. In the preferred embodiment, battery 209 is two 1.5 volt alkaline cells connected between pins 3 and 6 of signal means 201. Quartz crystal resonator 213 is connected between pins 7 and 8 of signal means 201. Pin 2 of signal means 201 is coupled to pin 1 of signal means 201. Pin 17 of signal means 201 is coupled to pin 6 of signal means 201.

In the preferred embodiment, programming interface 211 comprises a plurality of conductive pads 215, 217, 219, 221, 223, 225, 227, 229, 231 disposed on circuit board 233 in close physical proximity and alignment with said plurality of programming ports 119 on case 103 of FIG. 1.

Conductive pad 215 is electrically connected to pin 6 of signal means 201. Conductive pad 217 is electrically connected to pin 3 of signal means 201. Conductive pad 219 is electrically connected to pin 4 of signal means 201. Conductive pad 221 is electrically connected to pin 5 of signal means 201. Conductive pad 223 is electrically connected to pin 9 of signal means 201. Conductive pad 225 is electrically connected to pin 16 of signal means 201. Conductive pad 227 is electrically connected to pin 15 of signal means 201. Conductive pad 229 is electrically connected to pin 14 of signal means 201. Conductive pad 231 is electrically connected to pin 13 of signal means 201.

FIG. 2 also shows the plurality of programming probes 139 of FIG. 1 in schematic form. Specifically, programming probe 235 is shown coupled to conductive pad 215. Programming probe 237 is shown coupled to conductive pad 217. Programming probes 239 is shown coupled to conductive pad 219. Programming probes 241 is shown coupled to conductive pad 221. Programming probe 243 is shown coupled to conductive pad 223. Programming probe 245 is shown coupled to conductive pad 225. Programming probe 247 is shown coupled to conductive pad 227. Programming probe 249 is shown coupled to conductive pad 229. Programming probe 251 is shown coupled to conductive pad 231.

FIG. 2 also depicts programming means 251 for programming the reprogrammable memory 203 of signal means 201 with a selected sequence of digits during a programming mode. In the simplest embodiment, this programming means could comprise a matrix keypad, of the type generally available in the industry, which is directly connected to the plurality of programming probe 139. The use of a matrix keypad as a programming means requires the manual entry of the desired phone number on the keypad when probes 139 are coupled to programming interface 211. While this will suffice for the programming of small quantities of portable dialer units 103, it will not economically serve for the programming of large quantities of portable dialer units. The programming means 251 employed in the preferred embodiment of the present invention will be described in greater detail in connection with FIG. 3 below. The matrix keypad depicted in FIG. 2 is a device well known in the art, requiring little explanation. It is a means for entering a sequence of selected digits that constitute at least one telephone number into reprogrammable memory means 203 of signal means 201.

The telephone dialer system of the present invention has two distinct modes of function: a programming mode, and a dialing mode. During the programming mode, the programming means 251 is releasably electrically coupled with the reprogrammable memory means 203 and a selected sequence of digits constituting at least one telephone number are entered into said reprogrammable memory means 203. Thereafter, the programming means 251 is decoupled from said reprogrammable memory means 203 of portable dialer unit 101. The portable dialer unit 101 will thereafter operate independently of the programming means 251.

During the dialing mode, the portable dialer unit 101 is placed in close physical proximity with a speaker of a telephone. Specifically, speaker opening 113 is aligned with the speaker of a telephone; directly below the speaker opening 113 is the audiofrequency output device 205. The operator then depresses switch means 207 which electrically couples pins 9 and 13 of signal means 210. This activates the last number redial feature of the signal means 201 to produce a sequence of dual tone modulated frequency signals corresponding to the digits stored in the reprogrammable memory means 203. This sequence of DTMF signals is routed to the audiofrequency output means which produces a sequence of audiofrequency signals corresponding to the sequence of DTMF signals produced by a signal means 201 during the dialing mode.

Figure 3:
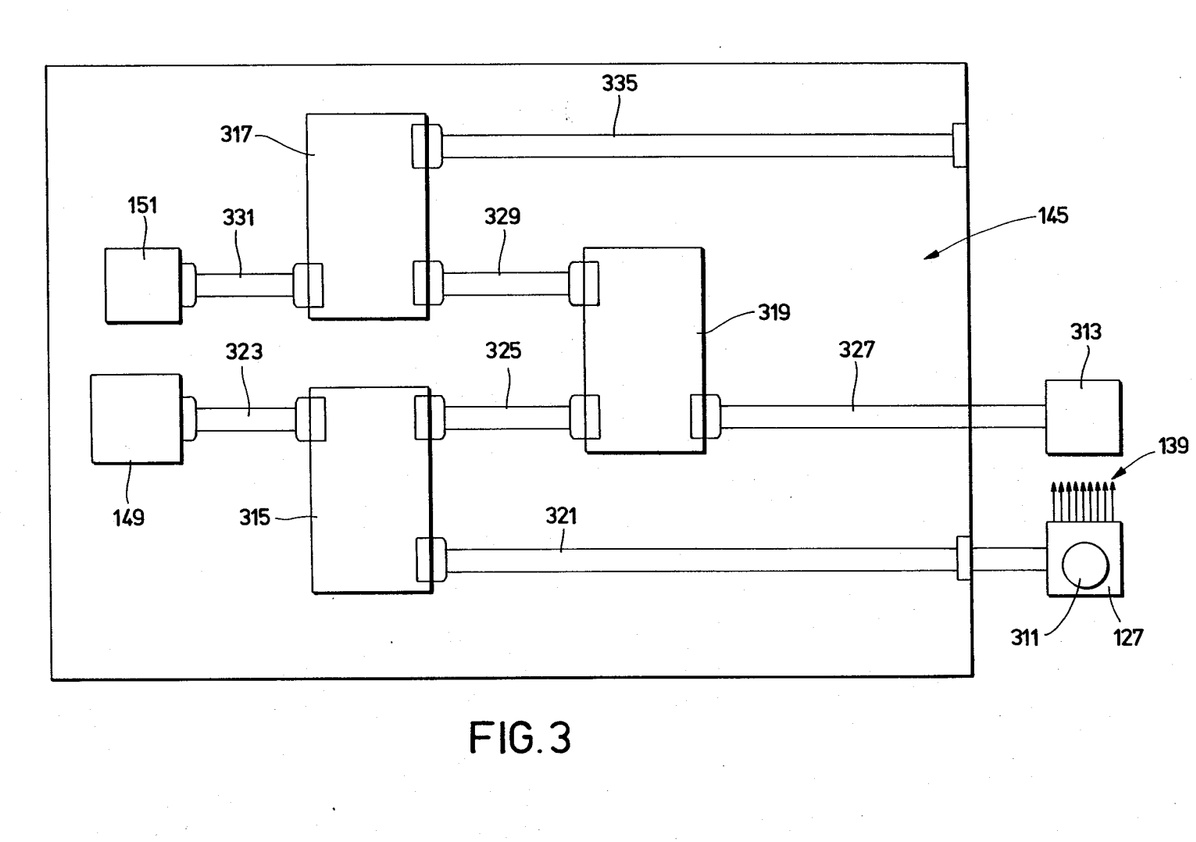
FIG. 3 is a block diagram of the programming module and programming head in accordance with the present invention.

FIG. 3 is a block diagram of the programming module 145 and programming head 127 in accordance with the present invention. The programming head 127 has a plurality of programming probes 139, and a microphone 311 which is carried directly under the microphone port 141 of FIG. 1. The programming module 145 comprises five functional blocks: liquid crystal display 151, keypad 149, programming interface 315, serial interface 317, and controller 319. These functional blocks are electrically coupled by a plurality of multi-wire conductor cables, know in industry as "headers".

Programming interface is electrically coupled to programming head through header 321. Keypad 149 is electrically coupled to programming interface 315 through header 323. Programming interface 315 is electrically coupled to controller 319 through header 325. Controller 319 is electrically coupled to serial interface 317 through header 329. Serial interface 317 is electrically coupled to liquid crystal display 151 through header 331. Power supply 313 is electrically coupled to programming module 145, at controller 319, by power cable 327. Serial interface 317 may be electrically coupled to a personal computer 157 of FIG. 1 through header 335. In the preferred embodiment, programming module 145 is operated independently of a personal computer 157; however, the programming module 145 may be operated as a slave to a personal computer 157, through use of header 335.

Figure 4:
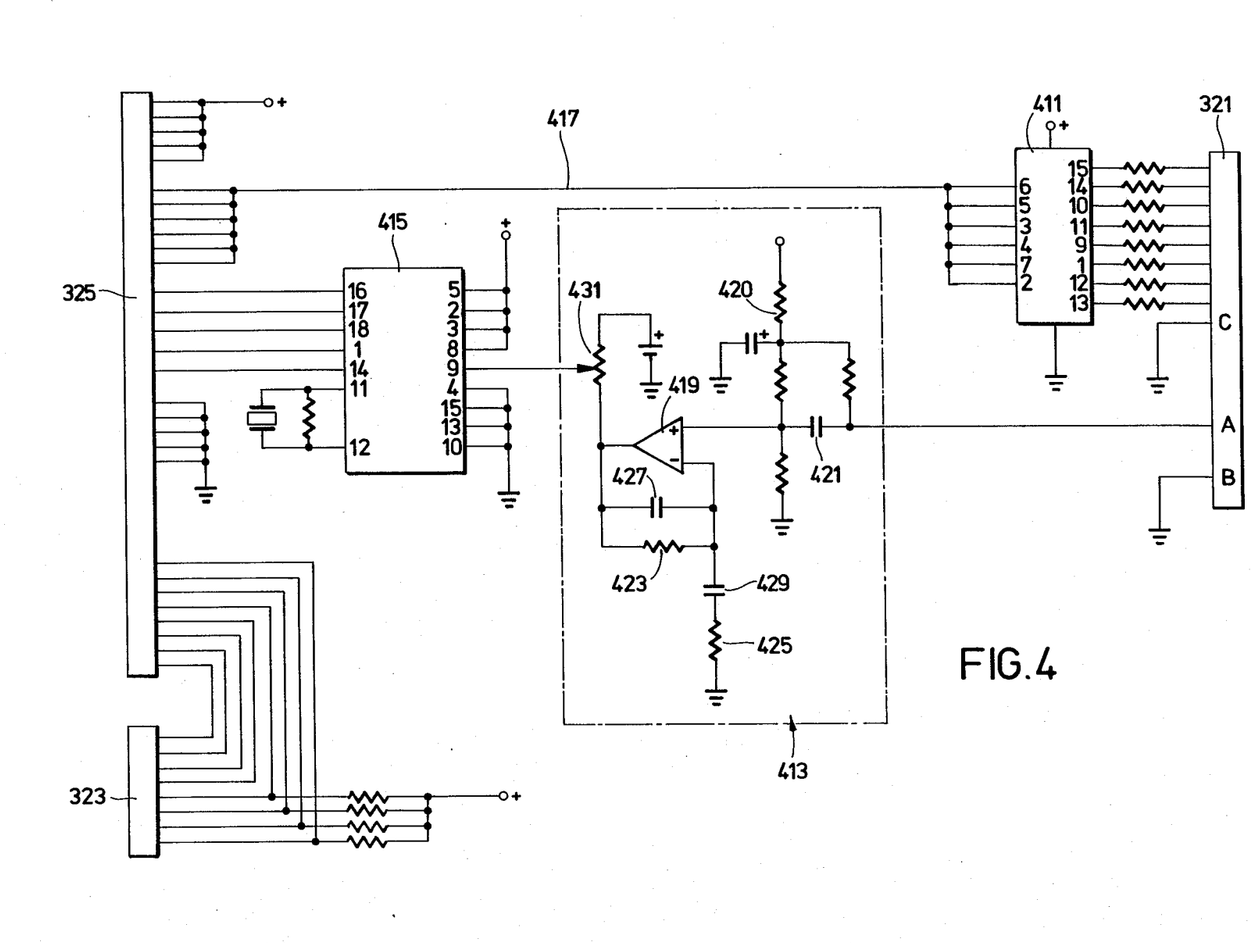
FIG. 4 is an electrical schematic and block diagram of the programming interface of the programming module in accordance with the present invention.

FIG. 4 is an electrical schematic and block diagram of the programming interface 315 of programming module 145 in accordance with the present invention.

The programming interface 315 performs two functions: it simulates a keypad, and it decodes the signal sensed by microphone 311 of FIG. 3 to test for accuracy in programming the portable dialer unit 101. The function of a matrix keypad is simulated by 4-by-4 crosspoint switch 411, which in the preferred embodiment is a Model No. MC142100. This 4-by-4 crosspoint switch 411 is a sixteen pin device. Pins 1, 9, 10, 11, 12, 13, 14, and 15 are coupled through header 321 to programming probes 139. The operation of the 4-by-4 crosspoint switch 411 is controlled by controller 319 of FIG. 3 through parallel interface 417, which is coupled to pins 2, 3, 4, 5, 6, 7 of 4-by-4 crosspoint switch 411. Parallel interface 417 is coupled to controller 319 through header 325.

The second function performed by the programming interface 315 relates to the testing of the portable dialer unit subsequent to programming, to determine if the programming unit has been accurately programmed and is operational under simulated "field" conditions. Microphone 311 of FIG. 3 is coupled to programming interface 315 through header 321. Specifically terminals A and B electrically couple the microphone to circuitry within programming interface 315. A amplifier/filter circuit 413 is coupled to terminal A. This amplifier/filter circuit 413 electrically simulates the distortion produced by the average telecommunications system.

In the preferred embodiment, amplifier/filter circuit 413 consists of operational amplifier 419 which receives the DTMF signal at its non-inverting input through coupling capacitor 421, and which provides a gain of approximately twenty-fold as determined by resistors 423 and 425. The frequency response of the circuit is determined by capacitors 427 and 429. A DC level is provided at the non-inverting input of operational amplifier 419 by voltage divider network 420. The output of operational amplifier 419 is routed through variable resistor 431, which serves as a volume control.

The output of operational amplifier 419 is directed to DTMF decoder 415, which, in the preferred embodiment, is a sixteen pin device manufactured by Solid State Scientific, Model No. SS11-202T. Pins 16, 17, 18, 1 and 14 of this component are electrically coupled to controller 319 through header 325.

Terminal C of header 321 represents the electrical connection for start button 143 of FIG. 1. Its electrical connection is not shown to simplify the drawing; however, it is coupled to controller unit through headers 321 and 325.

Figure 5:
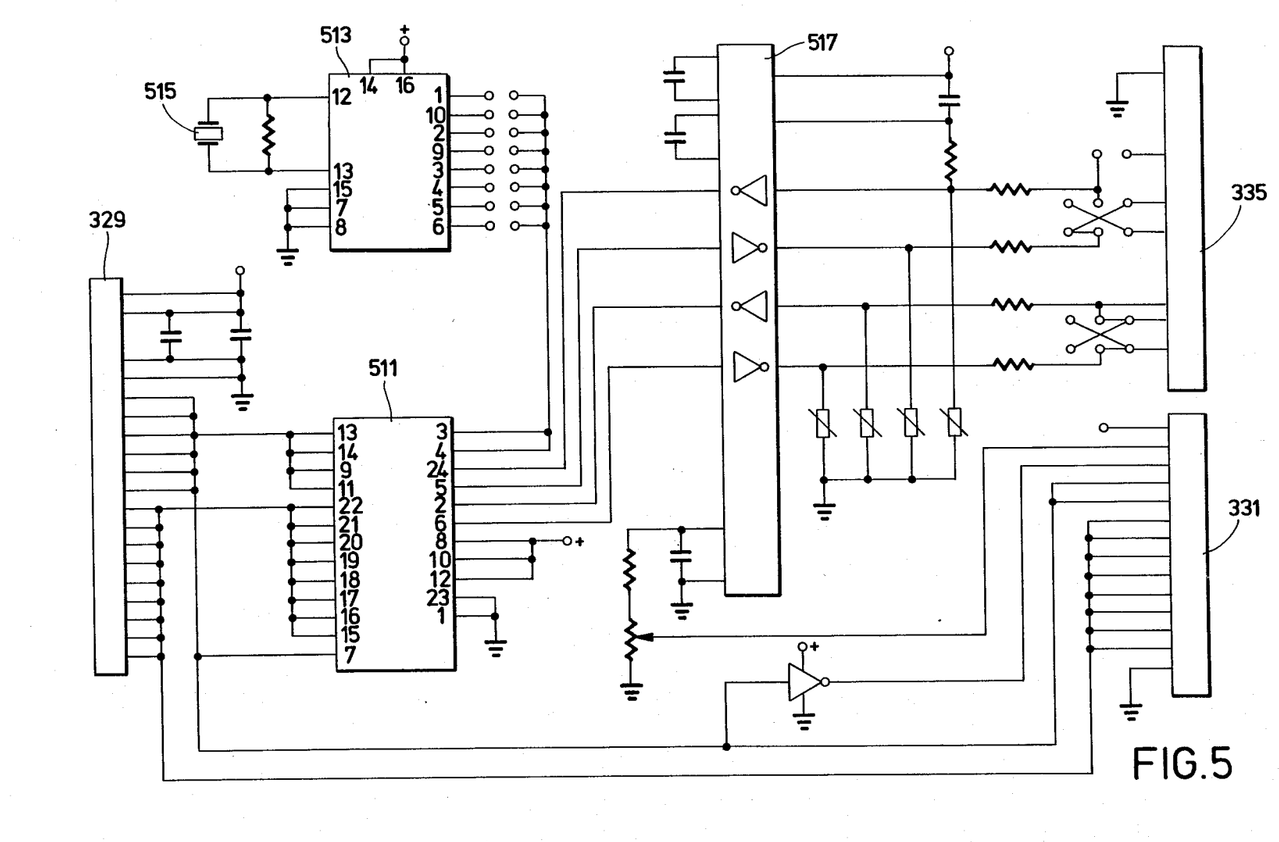
FIG. 5 is an electrical schematic and block diagram of the serial interface of the programming module in accordance with the present invention.

FIG. 5 is an electrical schematic block diagram of the serial interface 317 of programming module 145. This serial interface 317 is of the type generally known in the art consisting of bi-directional communication means 511, a baud rate generator 513, a crystal oscillator 515, and a line driver 517.

In the preferred embodiment, the bi-directional communications means 511 is an ACIA 511 integrated circuit, Model No. MC6850, which allows the bidirectional communication of serial and parallel data. This bi-directional communication means 511 operates in conjunction with baud rate generator 513 and crystal oscillator 515.

In the preferred embodiment, baud rate generator is a Model No. MC145411, that is connected to pins 3 and 4 of bi-directional communication means 511, while crystal oscillator 515 is a 1.8432 megahertz crystal oscillator connected between pins 12 and 13 of baud rate generator 513. Bi-directional communication means 511 is coupled to controller 319 through header 329. It is coupled to liquid crystal display 151 through header 331.

In addition, programming module 145 may be driven by a personal computer through line drivers 517, which in the preferred embodiment is a Model No. MAX232 line driver, which buffers data in and out of the system. Line driver 517 may be coupled to a personal computer through header 335; it is coupled to bi-directional communication means 511 at pins 2, 5, 6, and 24.

Controller unit 319 of FIG. 3 is a Motorola microprocessor, of the type widely known and used in the industry. Briefly, this controller comprises a microprocessor, model number MC146805, with a read only memory chip MC27C64, a random access memory chip MC6264, and a 74HC373 address bus buffer. A parallel interface is provided by an MC146823 integrated circuit. A real time clock is provided by an MC14818A timer.

Figure 6A:
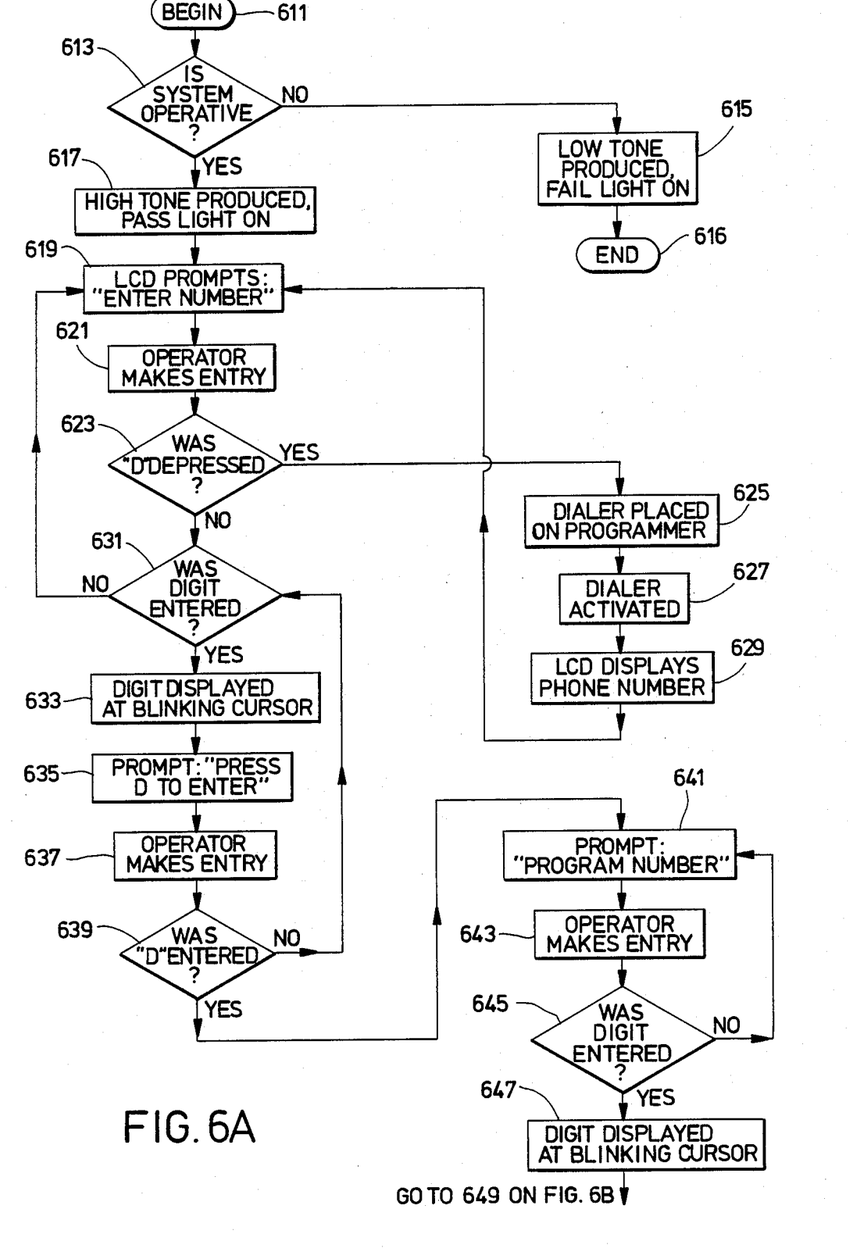
FIGS. 6A and 6B are flow chart diagrams of the method of programming dialers.
Figure 6B:
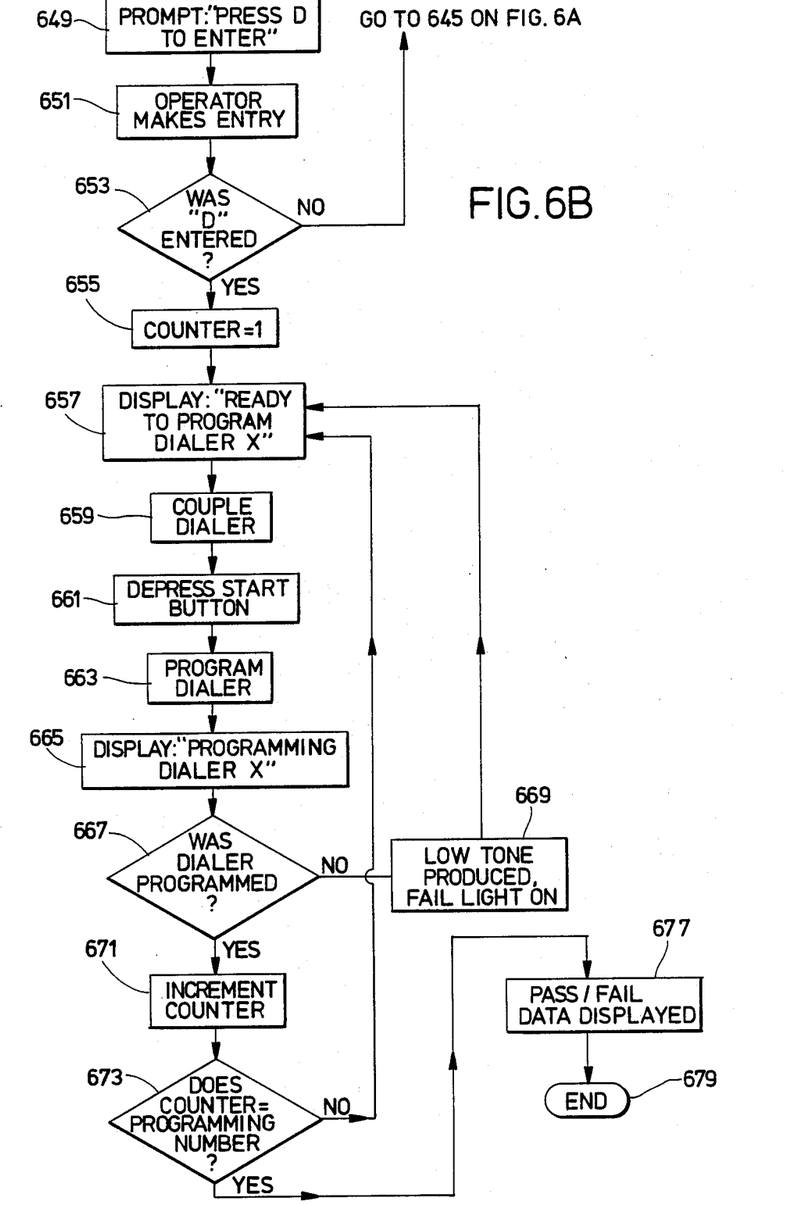

FIGS. 6A and 6B are flow charts depicting the preferred method of programming a plurality of dialers. FIGS. 1, 6A and 6B will now be used to describe the preferred method of programming.

At step 611, the programming process begins when the programming module 145 is plugged into an appropriate power source. The programming module 145 is automatically tested to determine if the system is operative at step 613. If the system is not operative, at step 615, a low audible tone is generated by microphone 311 of FIG. 3 which also serves as a speaker, and the fail light 155 of FIG. 1 is energized, and the programming process ends at step 616. If however, the system is operative, at step 617, a high tone is produced, and the pass light 153 is energized.

Next, at step 619, the liquid crystal display 151 prompts the operator to "enter number". At step 621, the operator depresses one key of keypad 149.

In step 623, the programming module 145 determines if the operator depressed the "D" key. If so, the programming module 145 enters a test subroutine which allows the operator to determine the telephone number of an already programmed dialer unit 101. Specifically, the operator places the dialer on the programming head 127 at step 625, and actuates the dialer at step 627. The tones generated by the dialer unit are detected by microphone 311 of FIG. 3, and directed from the programming head 127 to the programming module 145 The signal is decoded by the programming module 145, and a liquid crystal display 151 displays the number programmed in the dialer memory at step 629.

If however, at step 623, it is determined that the "D" key was not depressed, the programming module 145 determines whether a number was entered at step 631. If not, the program returns to step 619. If so, the digit entered at step 621 is displayed at the blinking cursor of liquid crystal display 151, in step 633. Next, in step 635, the liquid crystal display 151 prompts the operator to "press D to enter".

At step 637, the operator again depresses another key of keypad 149. In step 639, the programming module 145 determines whether the "D" key was entered. If not, the program returns to step 631, and the operator continues entering digits until the entire telephone number is displayed on the liquid crystal display 151 as desired.

If, at step 639, the programming module 145 determines that "D" was depressed, the liquid crystal display 151 prompts the operator to "program number" at step 641. At this stage, the operator may program the programming module 145 with the particular number of dialers to be sequentially programmed. In response to this prompt, the operator depresses a key of keypad 149 at step 643.

Next, in step 645, the programming module 145 determines whether a digit was entered by the operator in step 643. If not, the program returns to step 641, again prompting the operator to insert the number of dialers desired to be sequentially programmed. If so, the digit entered at step 643 is displayed at the blinking cursor of liquid crystal display 151 in step 647. In step 649, the liquid crystal display 151 prompts the operator to "press D to enter". In response to the prompt, the operator depresses a key on keypad 149 in step 651.

In step 653, the programming module 145 determines whether the "D" key was entered. If not, the program returns to step 645. This loop is provided to allow multi-digit entries. If so, an internal counter is set to 1 at step 655. Then, at step 657, liquid crystal display 151 displays "ready to program dialer x", where "x" corresponds to the number in counter memory.

At step 659, the operator couples a dialer unit to the programming head 127. Then, in step 661, the operator depresses start button 143 on programming head 127 to initiate the programming sequence.

The programming of the dialer is accomplished in step 663. Specifically, the sequence of digits comprising a telephone number that was programmed into the programming module 145 are sequentially entered into the dialer memory through programming probes 139. As each digit is entered in the dialer memory, the dialer speaker produces a corresponding dial tone. This dial tone is sensed by microphone 311 of FIG. 3, and directed from programming head 127 to programming module 145, where it is decoded and displayed on the liquid crystal display 151.

At step 667, the programming module 145 compares the sequence of digits actually programmed into the dialer with the sequence of digits stored in programming module 145 memory. The numbers may not match due to defective dialers, poor acoustic coupling between the dialer and the programming head 127, or electrical failure. If it is determined that the dialer was not programmed correctly, a low tone is produced, and the fail light is energized in step 669, and the program returns to step 657, allowing the operator another chance at programming the dialer.

If, however, the telephone number in the programming module memory and the telephone number actually programmed into the dialer correspond, the counter is incremented at step 671. Then, in step 673, the programming module 145 determines if the value of the counter is equal to the number sought to be programmed. If not, the program returns to step 657, and the programming process continues. If so, the liquid crystal display 151 displays pass/fail data. Specifically, the liquid crystal display 151 will display the total number of dialers successfully programmed, and the total number of dialers unsuccessfully programmed. At step 679, the programming process ends.

The programming method depicted in FIG. 6A and 6B and described above has many distinct advantages. First, it allows for the successive programming of a large number of dialers in a partially automated process. This greatly reduces the cost of custom programming the unprogrammed dialer units. Second, the programming process has a test subroutine which allows one to examine the particular number already programmed into a dialer unit. This is a particularly helpful feature in the event that dialers programmed with different telephone numbers are intermixed. Third, this programming method is designed so that as each dialer unit is programmed, it is simultaneously tested and compared to the telephone number intended to be programmed in said dialer. Such testing occurs under simulated "field conditions", since the dial tones are directed from the microphone 311 through a trunk circuit prior to decoding, and shown in FIG. 4. Thus, defective, or improperly programmed dialers can be detected immediately and discarded or reprogrammed. Fourth, upon the completion of a programming sequence, the programming module automatically provides pass/fail data which is useful quality control information.

While the invention has been described in only one of its forms, it should be apparent to those skilled in the art that it is not so limited, but is susceptible to various changes and modifications without departing from the spirit thereof.

We claim:

1. A portable telephone dialer for producing a sequence of dual tone modulated frequencies corresponding to a telephone number during a dialing mode adapted to be preprogrammed with a telephone number by a programming unit having a plurality of programming probes during a programming mode, comprising:

a case having at least one surface for substantially enclosing a small volume;

a dual tone modulated frequency generating integrated circuit, disposed within said case having last number redial capability and at least one redial input contact for actuating said last number redial capability, said dual tone modulated frequency generating integrated circuit including a reprogrammable memory of the type capable of storing a sequence of digits, and a signal generator for producing a sequence of dual tone modulated frequency signals corresponding to said sequence of digits stored in said memory;

a programming interface means, electrically coupled to said reprogrammable memory, for releasably electrically coupling said reprogrammable memory with said plurality of programming probes of said programming unit during said programming mode;

an audiofrequency output means coupled to said signal generator for producing a sequence of audible audiofrequency signals corresponding to said sequence of dual tone modulated frequency signals produced by said signal generator during said dialing mode;

at least one battery disposed within said case and electrically coupled to said reprogrammable memory means, said signal generator, and said audiofrequency output means, for providing power to said memory means, said signal generator, and said audiofrequency output means; and a single bi-state, switch electrically coupled to said at least one redial input contact and operable from the exterior of said case for activating said last number redial capability and causing said signal generator to produce said sequence of dual tone modulated frequency signals corresponding to said digits stored in said preprogrammed memory wherein, subsequent to programming, said portable telephone dialer is operable exclusively through said last number redial capability, restricting said portable telephone dialer to dialing said sequence of digits stored in said reprogrammable memory.

2. An apparatus according to claim 1 wherein said signal means directly drives said audiofrequency output means.

3. An apparatus according to claim 1 wherein said memory means and said signal means are disposed on a single integrated circuit.

4. An apparatus according to claim 1 wherein said case has at least one substantially planar surface adapted to receive advertising material.

5. A portable telephone dialer for producing a sequence of dual tone modulated frequencies corresponding to a telephone number during a dialing mode adapted to be preprogrammed with a telephone number by a programming unit having a plurality of programming probes during a programming mode, comprising:

a case having at least one surface for substantially enclosing a small volume;

a plurality of programming ports disposed on said at least one surface of said case for allowing the insertion of said plurality of programming probes into said volume substantially enclosed by said case during said programming mode;

a circuit board disposed within said case having a plurality of conductive pads carried in close proximity and alignment with said plurality of programming ports for releasably electrically coupling with said programming probes during said programming mode;

a dual tone modulated frequency generating integrated circuit having last number redial capability, mounted on said circuit board and having a plurality of input contacts electrically coupled to said plurality of conductive pads, at least one redial input contact for actuating said last number redial capability, said dual tone modulated frequency generating integrated circuit being of the type having an internal, programmable, and reprogrammable memory of the type capable of storing a single telephone number consisting of at least seven digits, and a signal generator for producing a sequence of dual tone modulated frequency signals corresponding to said telephone number stored in said memory, wherein said reprogrammable memory means is preprogrammed by said programming unit during said programming mode while remaining substantially enclosed within said case;

audiofrequency output means carried at least in part by said case and electrically coupled to said dual tone modulated frequency generating integrated circuit for producing a sequence of audible dual tone modulated frequency signals corresponding to said telephone number;

at least one battery disposed within said case and electrically coupled and providing power to said dual tone modulated frequency generating integrated circuit and said audiofrequency output means; and a single, bi-state switch electrically coupled to said at least one redial input contact and operable from the exterior of said case for activating said last number redial capability of said dual tone modulated integrated circuit to produce dual tone modulated frequency signals corresponding to said telephone number stored in said memory during said programming mode, wherein subsequent to programming said portable telephone dialer is operable exclusively through said last number redial capability, restricting said portable telephone dialer to dialing said single telephone number.

6. An apparatus according to claim 5 wherein said case has at least one substantially planar surface adapted to receive advertising material.

7. An apparatus according to claim 5 wherein said dual tone modulated frequency generating circuit directly drives said audiofrequency output means.

8. A telephone dialer system, comprising:
(a) a portable telephone dialer, including:
   a case having at least one surface for substantially enclosing a small volume;
   a dual tone modulated frequency generating integrated circuit having last number redial capability and at least one redial input contact for actuating said last number redial capability, including a reprogrammable memory means for storing a selected sequence of digits and a signal means for producing a sequence of dual tone modulated frequency signals;
   wherein said reprogrammable memory means is disposed within said case for storing a selected sequence of digits during a programming mode, said digits constituting at least one telephone number and
   wherein said signal means is disposed within said case and electrically coupled to said reprogrammable memory means, for producing a sequence of dual tone modulated frequency signals corresponding to at least a subset of said digits stored in said reprogrammable memory means during a dialing mode;
   an audiofrequency output means electrically coupled to said signal means for producing a sequence of audiofrequency signals corresponding to said sequence of dual tone modulated frequency signals produced by said signal means during said dialing mode;
   at least one battery disposed within said case, electrically coupled and providing power to said reprogrammable memory means, said signal means, and said audiofrequency output means;
   switch means electrically coupled to said at least one redial input and operable from the exterior of said case for activating said last number redial capability to cause said signal means to produce said sequence of dual tone modulated frequency signals during said dialing mode corresponding to said at least one subset of said selected digits stored in said reprogrammable memory means and for causing said audiofrequency output means to produce a sequence of audible audiofrequency dual tone modulated frequency dialing tones corresponding to at least one subset of said selected digits stored in said reprogrammable memory means;
(b) a programming unit, including:
   programming means for programming said reprogrammable memory means with said selected sequence of digits during said programming mode; and
   means for releasably electrically coupling said reprogrammable memory means and said programming means only during said programming mode and for decoupling said reprogrammable memory means from said programming means subsequent to the programming of said sequence of digits stored in said reprogrammable memory means;
(c) wherein, subsequent to programming, said portable telephone dialer is operable exclusively through said last number redial capability, restricting said portable telephone dialer to dialing only digits stored in said reprogrammable memory during said programming mode.

9. An apparatus according to claim 8 wherein said case has at least one substantially planar surface adapted to receive advertising material.

10. An apparatus according to claim 8 wherein said reprogrammable memory means and said signal means are disposed on a single integrated circuit.

11. An apparatus according to claim 8 wherein said signal means directly drives said audiofrequency output means.

12. A telephone dialer system according to claim 8, further comprising:
means for examining the content of said reprogrammable memory means subsequent to the programming of said memory means by said programming means; and a means for determining if said reprogrammable memory means has been erroneously programmed with a sequence of digits that differ from said selected sequence of digits.

13. A telephone dialer system according to claim 8, further comprising:
means for testing the coordinated operation of said reprogrammable memory means, said signal means, and said audiofrequency output means subsequent to the programming of said reprogrammable memory means by said programming means.

14. A telephone dialer system according to claim 8, wherein said programming means comprises:
a numeric key pad operable during said programming mode for entering said selected sequence of digits;
a microcomputer having a memory for storing said selected sequence of digits entered on said numeric keypad;
a display means for displaying said selected sequence of digits entered on said numeric keypad and stored in said memory of said microcomputer; and
simulator means for electrically simulating the operation of a telephone keypad in a sequence corresponding to said selected sequence of digits stored in said memory of said microcomputer, wherein the operation of said simulator means during said programming mode is controlled by said microcomputer.

15. A telephone dialer system, comprising:
a case having at least one surface for substantially enclosing a small volume;
reprogrammable memory means disposed within said case for storing a selected sequence of digits during a programming mode, said digits constituting a single selected telephone number;
signal means disposed within said case electrically coupled to said reprogrammable memory means for producing a sequence of dual tone modulated frequency signals corresponding to said single selected telephone number stored in said reprogrammable memory means during a dialing mode;
an audiofrequency output means electrically coupled to said signal means for producing a sequence of audiofrequency signals corresponding to said sequence of dual tone modulated frequency signals produced by said signal means during said dialing mode;
at least one battery disposed within said case, electrically coupled and providing power to said reprogrammable memory means, said signal means, and said audiofrequency output means;
a single, bi-state switch operable from the exterior of said case for activating said signal means to produce said sequence of dual tone modulated frequency signals during said dialing mode corresponding to said digits in said reprogrammable memory means;
programming means for programming said reprogrammable memory means with said single selected telephone number during said programming mode; and
means for releasably electrically coupling said reprogrammable memory means and said programming means only during said programming mode and for decoupling said reprogrammable memory means from said programming means subsequent to the programming of said single selected telephone number in said reprogrammable memory means.

16. An apparatus according to claim 15 wherein said signal means directly drives said audiofrequency output means.

17. An apparatus according to claim 15 wherein said memory means and said signal means are disposed on a single integrated circuit.

18. An apparatus according to claim 15 wherein said case has at least one substantially planar surface adapted to receive advertising material.

19. A telephone dialer system according to claim 15 further comprising:
means for examining the content of said reprogrammable memory means subsequent to the programming of said memory means by said programming means; and
means for determining if said reprogrammable memory means has been erroneously programmed with a sequence of digits that differ from said selected sequence of digits.

20. A telephone dialer system according to claim 15, further comprising:
means for testing the coordinated operation of said reprogrammable memory means, said signal means, and said audiofrequency output means subsequent to the programming of said reprogrammable memory means by said programming means.

21. A telephone dialer system according to claim 15 wherein said programming means comprises:
a numeric key pad operable during said programming mode for entering said selected sequence of digits;
a microcomputer having a memory for storing said selected sequence of digits entered on said numeric keypad;
a display means for displaying said selected sequence of digits entered on said numeric keypad and stored in said memory of said microcomputer; and
simulator means for electrically simulating the operation of a telephone keypad in a sequence corresponding to said selected sequence of digits stored in said memory of said microcomputer, wherein the operation of said simulator means during said programming mode is controlled by said microcomputer.

22. A telephone dialer system, comprising:
a case having at least one surface for substantially enclosing a small volume;
reprogrammable memory means disposed within said case for storing a selected sequence of digits during a programming mode, said digits constituting at least one telephone number;
signal means disposed within said case electrically coupled to said reprogrammable memory means for producing a sequence of dual tone modulated frequency signals corresponding to said at least one telephone number stored in said reprogrammable memory means during a dialing mode;
an audiofrequency output means electrically coupled to said signal means for producing a sequence of audiofrequency signals corresponding to said sequence of dual tone modulated frequency signals produced by said signal means during said dialing mode;
at least one battery disposed within said case, electrically coupled and providing power to said reprogrammable memory means, said signal means, and said audiofrequency output means;
a single, bi-state switch operable from the exterior of said case for activating said signal means to produce said sequence of dual tone modulated frequency signals during said dialing mode corresponding to said digits in said reprogrammable memory means;

programming means for programming said reprogrammable memory means with said at least one telephone number during said programming mode; and means for releasably electrically coupling said reprogrammable memory means and said programming means only during said programming mode.

* * * * *